United States Patent [19]

Hamburg

[11] 3,719,831

[45] March 6, 1973

[54] LOGARITHMIC IF AMPLIFIER

[75] Inventor: Douglas R. Hamburg, Birmingham, Mich.

[73] Assignee: The United States of America as represented by the Secretary of the Air Force, Washington, D.C.

[22] Filed: Feb. 18, 1969

[21] Appl. No.: 800,838

[52] U.S. Cl. ......................307/230, 328/145, 330/18

[51] Int. Cl. ..................................................G06g 7/12

[58] Field of Search ....328/145; 307/230; 330/18, 22

[56] References Cited

UNITED STATES PATENTS 3,061,789 10/1962 Mace..................................328/145

3,374,361 3/1968 Callis..................................328/145

*Primary Examiner*—Benjamin A. Borchelt

*Assistant Examiner*—N. Moskowitz

*Attorney*—Harry A. Herbert, Jr. and Willard R. Matthews, Jr.

[57] ABSTRACT

The logarithmic IF amplifier disclosed herein is a synchronously tuned multi-stage cascaded transistor amplifier. Each amplifier stage includes an emitter follower and is loaded with modified complementary filter. This type of loading ensures a substantially purely resistive IF load driving point impedance and prevents change of the logarithmic characteristic at high input signal levels. The present invention also comprehends the use of series resistors in the base bias network to compensate for changes in gain resulting from decreased collector voltage during conditions of high signal level.

4 Claims, 4 Drawing Figures

INVENTOR.
DOUGLAS R. HAMBURG
BY Harry A. Herbert, Jr.
Willard R Matthews, Jr.
ATTORNEYS INVENTOR
DOUGLAS R HAMBURG
BY Harry A. Herbert, Jr.
Willard R. Matthews
ATTORNEYS

LOGARITHMIC IF AMPLIFIER

BACKGROUND OF THE INVENTION

This invention relates to radar and countermeasures systems and in particular to logarithmic IF amplifiers for use in seekers and for other radar uses. State of the art radar systems generally utilize linear-AGC amplifiers for such purposes. It has been found however that significant improvement in system performance can be attained by replacing the linear AGC amplifier with logarithmic IF amplifiers. There are several reasons for this. First, since the logarithmic amplifier transfer characteristic is essentially an inverse function of the radar antenna patterns, which are exponential in angle, the linear range of the resulting seeker characteristic can be substantially increased. Second, more reliable performance can be attained through elimination of the AGC networks and their associated low frequency drifts. Third, the logarithmic receiver is less sensitive to receiving antenna phase-center separation which is observed to cause distortion in the output of linear system receivers. This sensitivity to antenna spacing originates in the manner by which the AGC bias is developed: therefore, the performance of the logarithmic receiver, which employs no AGC feedback network is relatively unaffected by this parameter.

The fundamental requirements of logarithmic IF amplifier of the type comprehended by this invention are to produce a video output which is a logarithmic function of the IF input signal over a dynamic range of at least 50 db. In addition, the amplifier bandwidth must be wide enough to pass pulsed as well as cw signals.

One previous attempt to realize such an amplifier was by the use of a simple synchronously tuned cascaded stage IF amplifier whose compression or saturation output characteristics exhibited logarithmic tendencies. The achievable dynamic range of such an amplifier however is far short of that required. The limiting factor of this approach is that the total dynamic range of the amplifier must be derived from or dispatched by the output stage.

Another logarithmic IF amplifier design approach has been to incorporate compressional characteristics into the interstages coupling the active cascaded elements of the amplifier. Such an approach, however, requires extremely complex circuitry and is therefore not practical.

The present invention is directed toward means for replacing the linear AGC amplifier and in particular toward providing an improved logarithmic IF amplifier for such purpose.

SUMMARY OF THE INVENTION

The present invention comprises a cascaded-stage IF amplifier in which the logarithmic video output is derived by summing the average current contributions of each stage. As the amplifier stages begin to successively saturate, starting with the last stage and proceeding toward the input, an "average" (DC or video) component of transistor collector current builds up due to non-symmetrical stage limiting on positive and negative IF signal excursions. By summing these individual stage current contributions, a logarithmic output is achieved over a total dynamic range theoretically equivalent to the additive ranges of each individual stage.

The amplifier employs transistors for active elements and uses complementary filter sections to separate IF and video components while providing a constant load impedance for each amplifier section. Also series resistors are used in the negative supply network to compensate for changes in gain resulting from decreased collectors voltage during conditions of high signal level, thus making the transfer characteristic more nearly logarithmic.

It is a principle object of the invention to provide a new and improved amplifier means suitable for use in seekers and other radar applications.

It is another object of the invention to provide amplifier means of the type described having transfer characteristics that are compatible with radar antenna patterns.

It is another object of the invention to provide amplifier means of the type described that does not require associated AGC circuitry.

It is another object of the invention to provide amplifier means of the type described that displays minimum sensitivity to receiving antenna phase-center separation.

It is another object of the invention to provide a new and improved logarithmic IF amplifier having a wider dynamic range than state-of-the-art devices.

It is another object of the invention to provide a new and improved logarithmic IF amplifier having simplified interstage coupling means.

These, together with other objects, advantages and features of the invention, will become more apparent from the following detailed description when taken in conjunction with the illustrative embodiment in the accompanying drawing.

DESCRIPTION OF THE PREFERRED EMBODIMENT

Figure 1:
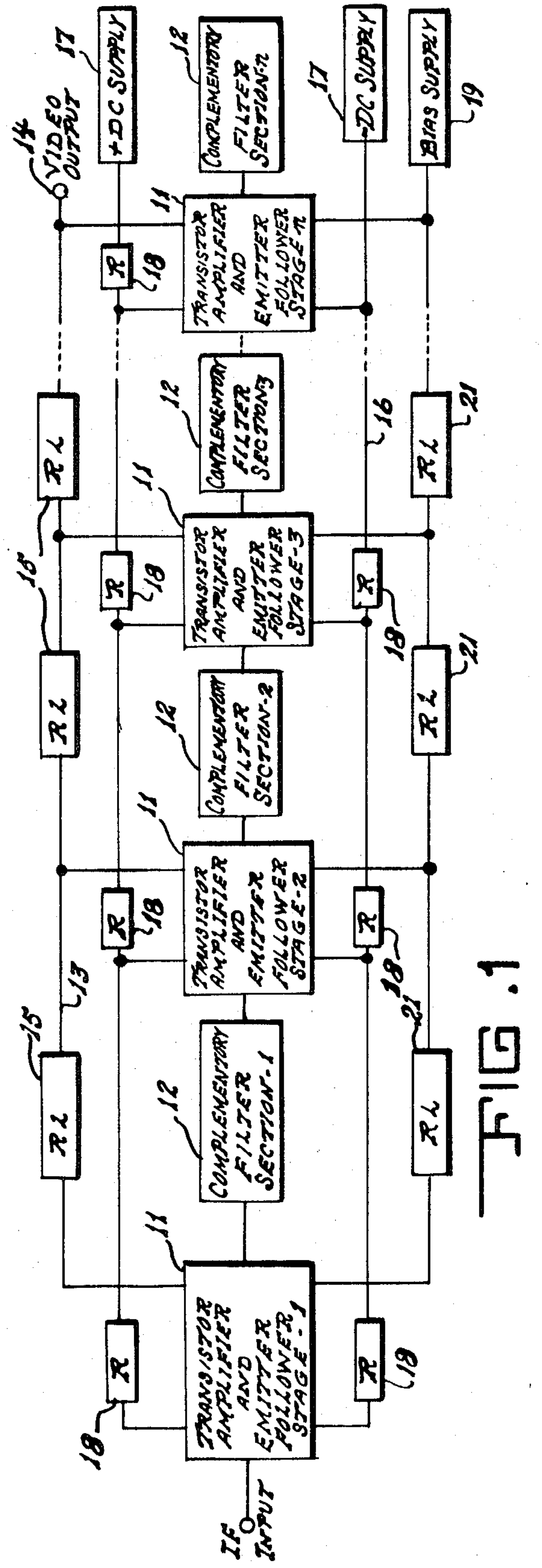
FIG. 1 is a block diagram of a logarithmic IF amplifier embodying the principles of the invention.

Referring now to FIG. 1, the block diagram therein illustrated defines the various stages and major components of a logarithmic IF amplifier of the type comprehended by the present invention. Such an amplifier comprises a multiplicity of amplifier stages 11 in a cascade arrangement. Each amplifier stage consists of transistor amplifier means in combination with an emitter follower. Each such amplifier stage is loaded by a complementary filter section 12. A video collector line 13 is connected to the output of each amplifier stage and to video output means 14. Video collector line 13 also includes series connected RL filters 15. The DC supply voltages are provided from DC supplies 17 through lines 16. The DC supply lines 13 and 16 also include series connected resistor 18. The bias supply is supplied from bias supply 19 through bias supply line 20, which line is loaded with series connected RL voltage dropping devices 21.

Figure 2:
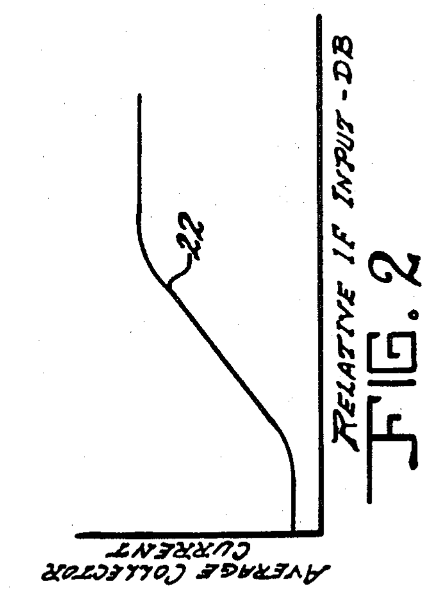
FIG. 2 is a curve illustrating the typical saturation characteristics of a one-stage transistor amplifier.

The cascaded IF amplifier of this invention derives a logarithmic output by adding the "detected video" current contributions of each stage. The manner in which this is accomplished can best be explained by first considering the transfer characteristic of a single stage, and then developing the procedure for cascading additional stages. FIG. 2 shows a typical saturation characteristic 22 of a one-stage transistor IF amplifier. The baseline or residual current is that which is drawn quiescently and for low signal levels. As the input signal is increased beyond the limit of linear operation, the collector current waveform dissymmetry gives rise to an average component which adds to the quiescent level. With further increase in input signal, the average current rises until hard saturation is reached. At this point the transistor functions as a switch, and the collector current waveform approaches a square-wave which varies from zero to a peak value determined by collector supply voltage and total path resistance (collector and emitter resistors). The transition region between quiescence and hard saturation can be made logarithmic over most of the range by proper adjustment of bias levels and external loading.

Figure 3:
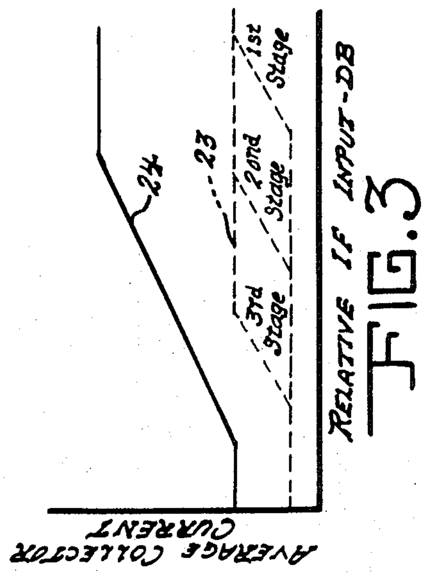
FIG. 3 illustrates curves showing amplifier dynamic range extension with cascaded sections.

Utilizing a cascaded configuration of such amplifiers results in a multi-stage amplifier which exhibits an extended logarithmic range in direct proportion to the number of stages employed. This property is illustrated in FIG. 3. The dashed lines 23 depict idealized responses of the individual stages, which are staggered so that the current of each stage begins to increase above its quiescent level at the point corresponding to hard saturation of the following stage. This condition is physically realized by equating the low-level (linear) gain of each stage to its characteristic logarithmic range. The solid curve 24 in FIG. 3 is the total amplifier output derived by summing the currents of each stage. The resulting dynamic range has obviously tripled. Therefore, the number of stages necessary for a specific logarithmic amplifier is determined by the total dynamic range required relative to the individual stage characteristic.

Figure 4:
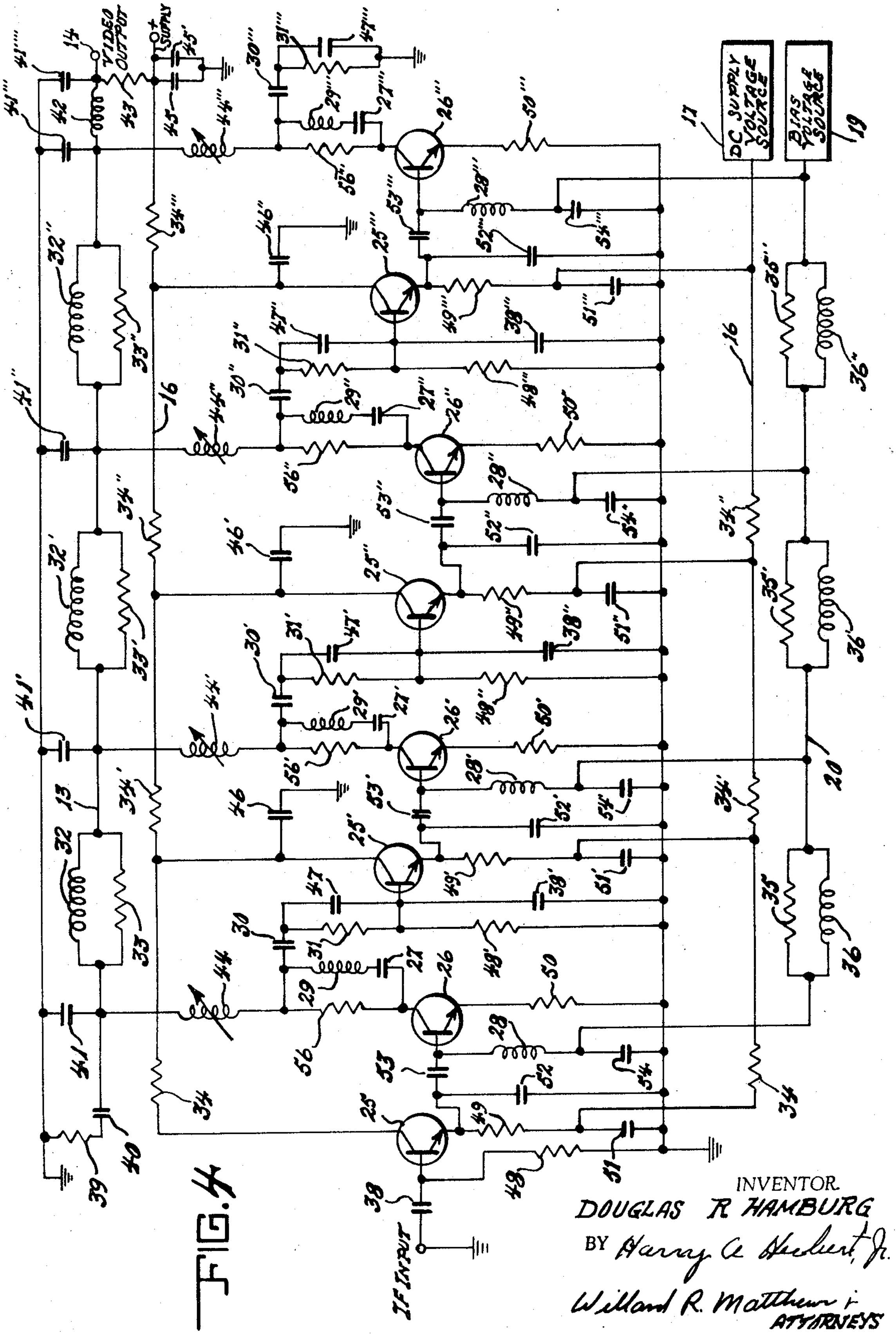
FIG. 4 is a schematic diagram of the logarithmic IF amplifier of FIG. 1.

The schematic diagram of the logarithmic IF amplifier is shown in FIG. 4. Inasmuch as the various stages are identical and components perform identical functions, reference numerals in the second, third and fourth stages are the same for components used in the first stage and are designated as to stage by the use of primes, double prime, etc. By way of example, reference to resistor 34 indicates resistors 34, 34', 34'' and 34'''. The amplifier is of a synchronously-tuned design utilizing eight transistors. The four transistors 26 function as amplifier stages, while the remaining four transistors 25 function as emitter follower stages. The collector currents of the amplifier stages are summed in collector line 13 and provide the video output. The emitter follower stages are used to provide isolation between the amplifier stages and to eliminate the need for neutralization. Thus, they prevent any amplifier stage from loading down the previous stage. The collector line used in the amplifier is simply a constant-k low-pass filter comprising capacitor 41 together with the parallel combination of resistor 33 and inductor 32 which filter provides transmission of the video frequencies but prevents propagation of the IF frequency. Resistors 39 and 43 provide termination for this line. The bias and supply voltages required for the various stages are fed through heavily bypassed lines 16 and 20. The resistors 34 and 35 in these lines are selected to provide adequate IF attenuation with little DC voltage drop. Resistors 34 also help form the overall logarithm shape. Inductances 36 with very low DC resistance are inserted in parallel with the resistors 35 in the B+ bias line 20 to prevent bias shifts at high signal levels due to an increase in the average base current. The inductances 28 which connect the bias line 20 to the bases of the amplifier stages are utilized for the same reason. To prevent IF loading, these base-feed inductances are parallel resonated with capacitors 52 inserted at the emitter follower outputs.

The load impedance for each amplifier stage is a modified complementary filter set comprising inductors 29 and 44, capacitors 27, 47 and 38' and resistors 31 48' and 56'. A complementary filter set is a network having a prescribed transmission characteristic from its input to output terminals, while at the same time having a purely resistive driving-point impedance. Such an impedance is required because the logarithmic characteristic of the amplifier stages at high input signal levels is dependent on the IF load driving-point impedance. The logarithmic characteristic would therefore change across the IF band unless the IF load driving-point impedance was made purely resistive.

The remainder of the circuit is designed in accordance with conventional electronic circuit practices. Inductors 42 and 44, capacitors 27, 38, 40, 45, 47, 51 and 53 and resistors 48, 49, 50 and 56 perform such routine functions as voltage dropping, DC isolation and the like.

While there has been described above the principles of the invention in connection with specific apparatus, it is to be clearly understood that this description is made only by way of example and not as a limitation to the scope of the invention.

What is claimed is:

1. A logarithmic IF amplifier comprising an IF input, a plurality of transistor amplifier stages in cascade circuit arrangement connected to said IF input, each said transistor amplifier stage comprising a transistor amplifier in combination with an emitter follower, a load impedance coupled to each said amplifier stage, each said load impedance comprising an RCL filter connected between the output of its associated amplifier stage and the base of the emitter follower of the next succeeding cascaded amplifier stage, said RCL filter having a discrete transmission characteristic between its input and output terminals and having a substantially purely resistive driving-point impedance, a video output, means for summing the outputs of said transistor amplifier stages, said summing means being connected to said video output, means for providing DC supply voltage and means for providing bias supply voltage, said DC supply voltage and said bias supply voltage means being connected to said transistor amplifier stages.

2. A logarithmic IF amplifier as defined in claim 1 wherein said means for supplying bias supply voltage comprises a bias voltage source in combination with a bias supply circuit, said bias supply circuit being connected to the base of each said transistor amplifier and having a resistance disposed between each same amplifier stage.

3. A logarithmic IF amplifier as defined in claim 2 wherein said bias supply circuit includes an inductor in parallel relationship with each said resistor.

4. A logarithmic IF amplifier as defined in claim 3 wherein said means for supplying DC supply voltage comprises a DC supply voltage source in combination with a DC supply voltage circuit, said DC supply voltage circuit having a first feed connected to the emitter of each said emitter follower means and having a resistor disposed between each said amplifier stage and a second feed connected to the collector of each said emitter follower and having a resistor disposed between each same amplifier stage.

* * * * *